Patented Mar. 1, 1932

1,847,442

UNITED STATES PATENT OFFICE

RALPH C. POLLOCK, OF LONG BEACH, CALIFORNIA, ASSIGNOR TO UNION OIL COMPANY OF CALIFORNIA, OF LOS ANGELES, CALIFORNIA, A CORPORATION OF CALIFORNIA

PROCESS FOR DECOLORIZING AND NEUTRALIZING OILS

No Drawing. Application filed February 1, 1926. Serial No. 85,379.

This invention relates to the art of decolorizing, clarifying and neutralizing oils, fats, waxes and the like, being particularly applicable to treatment of various petroleum lubricating oils.

The object of the invention primarily is to neutralize petroleum distillates by means of a short and efficient process, it being desirable to employ an activated raw earth or clay as a medium for the purpose.

It is common in the preparation of lubricating oils as fractions from crude petroleum distillation to treat the distillates with sulfuric acid, and it is an object of this invention to effect removal of coloring matter from such acid treated distillates, and to remove acid remaining from the treat whereby to neutralize the oil for commercial purposes.

Broadly stated the invention comprises treatment of the lubricating stock with an earth which has been treated or "activated" with an alkali agent such as sodium hydroxide or sodium silicate or a mixture of the two. For the purpose of attaining the desired results, activation and oil treatment may be accomplished in various ways. According to one form of the invention, the clay may first be activated and then used upon the oil, while in another form the clay with the activating agent may be added to the oil and the entire treatment carried out in a single stage. If necessary or desirable, the oil may receive a second stage treatment which may comprise, for example, treatment using a fresh quantity of clay containing a small quantity of alkali sufficient only to ensure a neutral condition of the oil. The invention resides further in the various steps, features and combinations thereof which will appear from the disclosures herein contained.

The present process, as employed according to its several modifications, is applicable for the production of various forms of lubricating oils including turbine oils which are rendered non-emulsifying by the treatment. Heretofore numerous attempts have been made both to accomplish neutralization of acid oils and to prepare non-emulsifying turbine oils, by means of a single-stage clay treatment, but so far as I am aware no successful method has been developed. Fundamentally it would appear that successful operation of the process, especially when dry-neutralizing an acid oil, resides in the presence of sodium silicate, which may be added as such or may be formed by the action of sodium hydroxide upon the clay either as a result of preliminary treatment of the clay or during treatment of the oil with the clay and alkali, although the silicate does not seem to be necessary when producing turbine oils from a "neutral" stock. The sodium silicate apparently has the property of effecting removal of calcium and magnesium oil-soluble soaps and such other compounds as tend to be formed, which, as the process has been carried out heretofore, have remained in the oil following earth treatment and have thereby increased the ash content of the product. Consequently when treating neutral stocks free from those calcium and magnesium oil-soluble soaps the use of silicate is not necessary, but obviously such treatment should be employed when such calcium and magnesium soaps are present. It appears to be desirable in most cases to employ water to improve the capacity of the clay to adsorb ash-forming impurities, although this also is not necessary when producing turbine oils from "neutral" stock. However, when water is employed a sufficient quantity must be added to ensure thorough wetting of the clay and good contact thereof with the oil under treatment.

Considering the invention more in detail, a "neutral" lubricating oil (i. e., one free from inorganic acidity) may be treated according to one form of the invention for the purpose of removing contained organic acidity to produce a non-emulsifying turbine oil, by adding from approximately 0.25% to 1% of sodium hydroxide solution which solution may vary from 4 to 18 times normal, and also adding thereto raw clay or earth in amount varying from approximately 3 to 12% of the oil, agitating the alkali-clay-oil mixture at a temperature as low as 130° F., or up to as high as 320° F. where it is necessary or desirable to drive off the water. Upon filtration, the oil is found to be non-emulsifying, and to have a good color and a satisfactorily low ash content; moreover neutralization is complete, the acid number then being zero or nearly so. In practice it probably will be found desirable to cool the mixture to about 240° F. or below for the purpose of filtering, in the event that the temperature during treament has been carried therebeyond.

As an example of the above process, 100 parts of oil may be treated with 12 parts of a raw clay such as Death-Valley clay, together with 1% of a 12N aqueous sodium hydroxide solution (i. e. a concentrated solution), the mixture being heated to 300° F. under agitation, cooled to 200° to 240° F., and filtered.

The above method may be modified by the addition of water, in which case as above indicated it will be necessary to use sufficient water to ensure good contact. For example, the amount of water may approximate the weight of the clay employed, but it may be varied considerably according to conditions.

The modification just described wherein water is added, may also be adapted to the treatment of acid oils, in which case however, it may be necessary to increase the quantity of alkali employed, for example, even up to as high as 2%. It might also be necessary to increase the quantity of the clay even up to as high as 16%. But in general the two modifications are the same. As an example of the treatment of acid oils according to this form, the oil may be mixed with 12% of clay, an equal quantity of water and 1% of sodium hydroxide, the oil mixture being heated, agitated, cooled and filtered somewhat as above. Or the oil mixture might be heated only to 240° F., agitated and filtered without appreciable cooling.

The process may conveniently be varied further, especially for acid oils, either by substituting an alkali silicate such as sodium silicate solution for the alkali or by adding a small quantity of such silicate. For example, where the silicate solution is used as a substitute for the alkali it may contain about 4% of 42° Bé. silicate and 12% of water based on the quantity of oil being treated, this amount of water being sufficient to thoroughly wet up to about 12% of clay and to ensure good contact thereof with the oil. Or where the sodium silicate is used in addition to the alkali solution a small amount thereof, for example about 1% of 42° Bé. silicate, may be introduced. For acid oil treatment it appears that best results are obtained only when the silicate, or some equivalent, is employed in order to effect removal of the calcium and magnesium soaps and similar impurities, although when water is added without silicate appreciable portions of these which are water-soluble are removed along with portions adsorbable by the clay in the presence of water. The above modification, wherein clay, alkali, water and sodium silicate are used, yields an excellent lubricating oil for general purposes, and in fact in itself produces directly from some acid oils fair grades of non-emulsifying turbine oils, and such also may be produced by the modification described in the following paragraph.

As a further modification, a clay containing sodium silicate may be prepared by treating a raw clay with sodium hydroxide previous to oil treatment. For example, the clay may be mixed with slightly more than an equal amount of water containing sodium hydroxide and agitated for a time at varying temperatures, or merely allowed to stand until an appreciable amount of sodium silicate has formed. The amount of alkali for example may be about 0.75% by weight of the acid oil to be treated, and the time of standing may vary from several hours to a few days. The resulting earth paste, without the removal of water or any further treatment, may be added to the acid oil, and agitated for example for about fifteen minutes at 115° F., the temperature being raised somewhat, as for example to 150° F., at which temperature agitation is continued for a few minutes, the temperature being finally raised to evaporate the water, whereupon the treat is completed at about 300° to 320° F., the mixture being filtered while warm. It is to be understood that the above conditions are given by way of example only since the temperature may be varied as heretofore indicated, and greater or smaller amounts of water, alkali and clay may be supplied according to the conditions.

The various modifications using silicate are primarily designed for use as single stage processes in order to avoid a second stage treat.

The various modifications above described may be supplemented, at least in some instances, by a second stage, which preferably will consist in treating the filtered oil with a fresh quantity of clay and a small amount of alkali according to the so-called "dry" neutralization method, wherein the amount of alkali solution is not sufficient to affect the powdered state of the clay. This second stage treatment may be employed particularly when it is desired to produce a non-emulsifying turbine oil directly from an acid oil, or when the color obtained by the first stage treatment in preparing a lubricating oil from an acid oil, is not satisfactory. As an example of a two-stage process according to this modification, an acid oil may be treated first with a slight excess of 10N sodium hydroxide solution, from 6 to 10% of raw earth, and an amount of water equal to about 90% of the weight of the earth. During this stage the temperature may if desired be carried up to only about 150° F., instead of 240° F. or above. After proper agitation the clay is separated by centrifuging or otherwise, and the filtrate subjected to the second stage. Here, about one-quarter of one percent of 10N sodium hydroxide solution (i. e. a concentrated solution) is added to the oil together with 8 to 12% of raw earth, and the mixture heated with agitation up to about 240° F. or high enough to drive off the water, the clay being then removed as by centrifuging or otherwise. The product is exceptionally light in color and extremely low in ash and acid content. This two-stage modification produces good lubricating oils not only serviceable for general purposes, but also applicable to turbine uses because of their sufficiently non-emulsifying characteristics.

However, it is particularly to be noted that good lubricating oils and fair turbine oils are obtained from acid stock by those single stage modifications alone wherein soluble silicates are employed.

Throughout the specification and claims, it is to be understood that the term "oil" refers to various oils, fats and waxes susceptible to treatment by the present process, and that the term "clay" or "earth" is intended to include any earthy material suitable for the purpose, such as fuller's earth and the various clays. Also, the term "alkali" is intended to include not only sodium hydroxide but also potassium hydroxide and any other suitable alkali.

I claim:

1. A process of treating oleaginous substances including petroleum lubricating oils comprising treating an oil with clay, in the presence of an alkali silicate solution, the amount of silicate being sufficient to react with the oil and heating thereby expelling water by evaporation.

2. The process of treating oil oleaginous substances including petroleum lubricating oils comprising treating an acid oil with clay, in the presence of sodium silicate the amount of silicate being sufficient to react with the oil and water sufficient to wet the clay and ensure good contact.

3. The process of preparing non-emulsifying turbine oils comprising treating a neutral mineral oil with approximately 3 to 12% of clay and an alkali not substantially exceeding 1% of the oil, heating, and removing the clay.

4. The process of treating oleaginous substances including petroleum lubricating oils comprising treating a clay with an alkali solution to form a soluble alkali silicate, and treating an oil by adding thereto the resulting clay and contained substances.

5. The process of treating oleaginous substances including petroleum lubricating oils comprising treating a clay with an alkali solution, containing water sufficient to thoroughly wet the clay, to form a soluble alkali silicate, mixing the resulting clay paste with an acid oil, and heating the mixture to expel excess water.

6. The process of treating oleaginous substances including petroleum lubricating oils comprising treating a clay with an alkali solution containing water approximately but not greatly exceeding the amount of the clay and containing alkali not greatly exceeding 1% of the oil to be treated whereby soluble alkali silicate is formed in the clay, mixing the resulting clay paste with an oil to be treated, heating to expel excess water, and removing the clay.

7. The process of treating oleaginous substances including petroleum lubricating oils comprising treating an acid oil with clay, sufficient to decolorize the oil, and in the presence of water and an alkali, heating, removing the clay, and subjecting the oil in a second stage to treatment with a second quantity of clay containing a relatively smaller amount of alkali.

8. The process of treating oleaginous substances including petroleum lubricating oils comprising treating an oil with clay containing, an alkali not greatly exceeding 1% of the oil, and water, heating, removing the clay, and subjecting the oil in a second stage to treatment with a second quantity of clay and alkali not substantially exceeding ¼% of the oil, heating thereby driving off the water, and removing the clay.

9. A process for refining petroleum oils comprising commingling a neutral petroleum oil with clay in the presence of a concentrated alkali solution, heating the mixture to evaporate water and effect good decolorization of the oil, and removing the clay.

10. A method for refining petroleum oils to prepare non-emulsifying turbine oils, comprising commingling the petroleum oil with clay in the presence of a solution of an alkali silicate the amount of silicate being sufficient to react with the oil, and heating to evaporate water and obtain good effects.

11. A process for preparing non-emulsifying turbine oils from lubricating oils free from inorganic acidity, comprising commingling such oils with a concentrated alkali solution and clay in the presence of each other, heating and removing the clay.

12. A one-step process for preparing non-emulsifying turbine oils comprising commingling a neutral oil with clay and concentrated alkali solution in the presence of each other, heating the mixture to a temperature to evaporate water, and removing the clay.

13. A method for preparing a non-emulsifying turbine oil comprising commingling a mineral oil free of inorganic acidity with clay in the presence of a concentrated alkali solution between approximately ten and eighteen times normal, heating, and removing the clay.

14. A method for treating acid-treated oils containing calcium and magnesium oil-soluble compounds, comprising commingling the oil with clay in the presence of alkali silicate solution and in the presence of substantial quantites of water, and reacting said silicate with said calcium and magnesium compounds to convert the latter into calcium and magnesium compounds substantially insoluble in the oil.

Signed at Wilmington, in the county of Los Angeles and State of California, this 13th day of January A. D. 1926.

RALPH C. POLLOCK.